United States Patent
Kim et al.

(10) Patent No.: US 11,411,237 B2
(45) Date of Patent: Aug. 9, 2022

(54) APPARATUS FOR CONTROLLING DRIVING OF FUEL CELL VEHICLE AND METHOD THEREOF

(71) Applicants: Hyundai Motor Company, Seoul (KR); Kia Motors Corporation, Seoul (KR)

(72) Inventors: Hyun Hie Kim, Seoul (KR); Chang Hwan Ye, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 52 days.

(21) Appl. No.: 16/889,312

(22) Filed: Jun. 1, 2020

(65) Prior Publication Data

US 2021/0091397 A1  Mar. 25, 2021

(30) Foreign Application Priority Data

Sep. 19, 2019  (KR) .................... 10-2019-0115426

(51) Int. Cl.
  *H01M 8/04746* (2016.01)
  *H01M 8/0438* (2016.01)
  *H01M 8/22* (2006.01)

(52) U.S. Cl.
  CPC ... *H01M 8/04753* (2013.01); *H01M 8/04432* (2013.01); *H01M 8/04783* (2013.01); *H01M 8/22* (2013.01); *H01M 2250/20* (2013.01)

(58) Field of Classification Search
  CPC ......... H01M 2250/20; H01M 8/04395; H01M 8/04432; H01M 8/04552; H01M 8/04589; H01M 8/04679; H01M 8/04753; H01M 8/04783; H01M 8/04992; H01M 8/1007; H01M 8/22; Y02E 60/50; Y02T 90/40
  See application file for complete search history.

(56) References Cited

U.S. PATENT DOCUMENTS 9,297,718 B2 *  3/2016  Van Doorn ....... H01M 8/04328
2018/0114996 A1 *  4/2018  Park .................. H01M 8/04559

* cited by examiner

*Primary Examiner* — Victoria H Lynch
(74) *Attorney, Agent, or Firm* — Fox Rothschild LLP

(57) ABSTRACT

An apparatus for controlling driving of a fuel cell vehicle and a method thereof are provided. The apparatus includes a fuel cell stack that generates electricity using a chemical reaction between hydrogen and oxygen and a pressure sensor that measures a pressure of hydrogen supplied to the fuel cell stack. A controller determines whether a current limit is caused by a failure of the fuel cell stack or a measurement error of the pressure sensor when the current limit occurs in the fuel cell stack.

6 Claims, 5 Drawing Sheets

APPARATUS FOR CONTROLLING DRIVING OF FUEL CELL VEHICLE AND METHOD THEREOF

CROSS-REFERENCE TO RELATED APPLICATION

This application claims the benefit of priority to Korean Patent Application No. 10-2019-0115426, filed on Sep. 19, 2019, the entire contents of which are incorporated herein by reference.

TECHNICAL FIELD

The present disclosure relates to a technique for controlling driving of a fuel cell vehicle, and more particularly, a method for controlling driving of a fuel cell vehicle when a current limit occurs while driving.

BACKGROUND

A fuel cell, which is a type of power generation device that converts chemical energy of a fuel into electrical energy by electrochemically reacting in a stack without converting it into heat by combustion, may be applied not only to power supply for industry, home and vehicle driving, but also to power supply of small electric/electronic products, specially portable devices. Currently, as a power supply source for driving a fuel cell vehicle, a polymer electrolyte membrane fuel cell (PEMFC) having the highest power density among fuel cells has been actively studied. The PEMFC has fast start-up time and fast power conversion reaction time due to low operating temperature.

The PEMFC includes a membrane electrode assembly (MEA) to which a catalytic electrode layer is attached, in which electrochemical reaction occurs on both sides of a solid polymer electrolyte membrane in which hydrogen ions move, a gas diffusion layer (GDL) which distributes reaction gases evenly and transmits the generated electrical energy, a gasket and a fastening member for maintaining tightness and proper fastening pressure of the reaction gases and cooling water, and a bipolar plate for moving the reaction gases and cooling water.

When assembling the fuel cell stack using such a unit cell configuration, a combination of the MEA and the GDL, which is a main component, is disposed innermost inside the cell. The MEA has a catalyst electrode layer coated with a catalyst such that hydrogen and oxygen are able to react on both sides of the PEMFC, that is, an anode and a cathode, and the GDL and the gasket are stacked on an outer portion at which the anode and the cathode are located. A separation plate, which is formed with a flow field through which a reaction gas (e.g., hydrogen as fuel and oxygen or air as oxidant) is supplied and cooling water passes, is disposed outside the GDL.

A plurality of unit cells, each of which has such a configuration, are stacked and then, an end plate for supporting a current collector, an insulation plate, and stacked cells is coupled to the outermost portion. Thus, a fuel cell stack is formed by repeatedly stacking and fastening the unit cells between the end plates. To obtain a potential required in an actual vehicle, the unit cells are be stacked by a required potential, and a stack is obtained stacking the unit cells. The potential generated in one unit cell is about 1.3V, and the plurality of cells are stacked in series to generate electric power required to drive a vehicle.

Meanwhile, a fuel cell vehicle includes a pressure sensor configured to measure the pressure of hydrogen supplied to the stack. Since a measurement error occurs in such a pressure sensor over time, the fuel cell vehicle compensates for the measurement error of the pressure sensor at every driving distance. However, even though the measurement error occurs in the pressure sensor when the fuel cell vehicle is parked for a substantial period of time, since the compensation for the measurement error of the pressure sensor is not made due to the insufficient mileage, the controller of the fuel cell vehicle operates the fuel cell vehicle based on an inaccurate hydrogen pressure value. In particular, the hydrogen supplied to the stack of the fuel cell vehicle may be insufficient to reduce the durability of the stack.

The matters described in this background section are intended to promote an understanding of the background of the disclosure and may include matters that are not already known to those of ordinal)/skill in in the art.

SUMMARY

The present disclosure provides an apparatus for controlling driving of a fuel cell vehicle and a method thereof which determines the cause of a current limit in the fuel cell vehicle being driven, turns on a warning light to induce movement to a repair shop when the cause is due to a failure of the fuel cell stack, and when the cause is due to the measurement error of a sensor (hereinafter, referred to as a pressure sensor) configured to measure the pressure of hydrogen supplied to the fuel cell stack, compensates for the measurement error, thereby preventing the durability of the fuel cell stack.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a fuel cell vehicle may include a fuel cell stack configured to generate electricity using a chemical reaction between hydrogen and oxygen, a pressure sensor configured to measure a pressure of hydrogen supplied to the fuel cell stack, and a controller configured to determine whether a current limit is caused by a failure of the fuel cell stack or a measurement error of the pressure sensor when the current limit occurs in the fuel cell stack.

The controller may be configured to calculate a minimum cell voltage and a cell voltage ratio by monitoring each cell of the fuel cell stack. The controller may be configured to determine that a failure occurs in the fuel cell stack when the minimum cell voltage is less than a first reference value, the cell voltage ratio is less than a second reference value, and a time point at which the current limit occurs does not exceed a reference time from a time point at which a measurement error of the pressure sensor is compensated. In particular, the controller may be configured to turn on a warning light in response to determining that a failure occurs in the fuel cell stack.

Additionally, the controller may be configured to perform a hydrogen purge based on a reference charge amount when the minimum cell voltage is less than a first reference value, the cell voltage ratio is less than a second reference value, and a time point at which the current limit occurs exceeds a reference time from a time point at which a measurement error of the pressure sensor is compensated. The controller may be configured to increase a hydrogen supply pressure to a threshold value when performing the hydrogen purge based on the reference charge amount.

Further, the controller may be configured to determine that a failure occurs in the fuel cell stack when the current limit is not removed even after preforming the hydrogen purge based on the reference charge amount. The controller may be configured to determine that a measurement error occurs in the pressure sensor when the current limit is removed after performing the hydrogen purge based on the reference charge amount. Additionally, the controller may be configured to compensate for the measurement error of the pressure sensor based on a difference between a pressure value measured by the pressure sensor and a reference pressure after opening a fuel-line purge valve (FPV) and a fuel-line drain valve (FDV).

According to an aspect of the present disclosure, a method of controlling driving of an fuel cell vehicle may include calculating a minimum cell voltage of a fuel cell stack and a cell voltage ratio, detecting a current limit of the fuel cell stack, and determining whether the current limit is caused by a failure of the fuel cell stack or a measurement error of a pressure sensor configured to measure a pressure of hydrogen supplied to the fuel cell stack based on the minimum cell voltage and the cell voltage ratio calculated.

The determining that a measurement error occurs may include determining that a failure occurs in the fuel cell stack when the minimum cell voltage is less than a first reference value, the cell voltage ratio is less than a second reference value, and a time point at which the current limit occurs does not exceed a reference time from a time point at which a measurement error of the pressure sensor is compensated. In particular, the determining of the failure occurrence in the fuel cell stack may include turning on a waning light. The determining may include determining that the measurement error occurs in the pressure sensor when the minimum cell voltage is less than a first reference value, the cell voltage ratio is less than a second reference value, and a time point at which the current limit occurs exceeds a reference time from a time point at which a measurement error of the pressure sensor is compensated.

Additionally, the determining of the measurement error occurrence in the pressure sensor may include performing a hydrogen purge based on a reference charge amount, determining that a failure occurs in the fuel cell stack when the current limit is not removed even after performing the hydrogen purge based on the reference charge amount, and determining that the measurement error occurs in the pressure sensor when the current limit is removed after performing the hydrogen purge based on the reference charge amount. The performing of the hydrogen purge based on the reference charge amount may include increasing a hydrogen supply pressure to a threshold value. The determining of the measurement error occurrence in the pressure sensor may include opening a fuel-line purge valve (FPV) and a fuel-line drain valve (FDV), and compensating for the measurement error of the pressure sensor based on a difference between a pressure value measured by the pressure sensor and a reference pressure when the FPV and the FDV are open.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
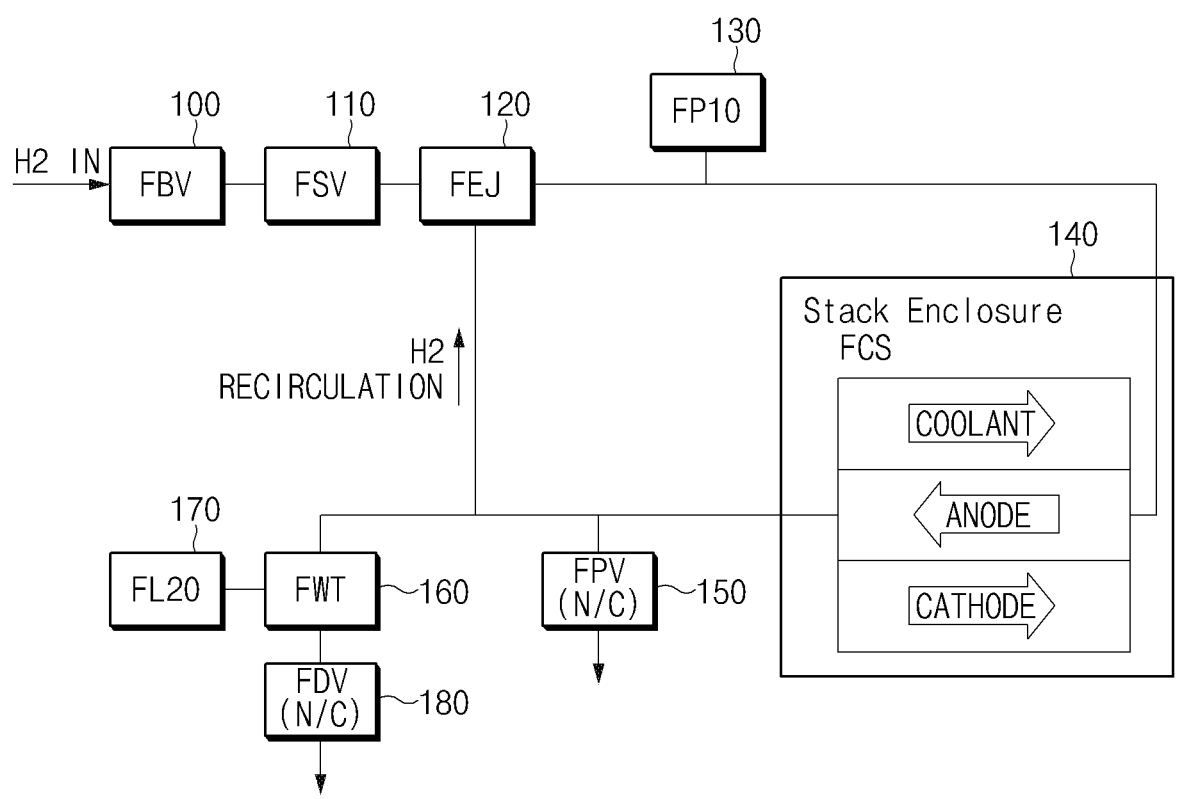
FIG. 1 is a view illustrating a hydrogen supply system of a fuel cell vehicle to which an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplar)/processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a hydrogen supply system of a fuel cell vehicle to which an exemplary embodiment of the present disclosure is applied. As shown in FIG. 1, a hydrogen supply system may include a fuel block valve (FBV) 100, a fuel supply valve (FSV) 110, a fuel ejector (FEJ) 120, a pressure sensor 130, a fuel cell stack (FCS) 140, a fuel-line purge valve (FPV) 150, a fuel-line water trap (FWT) 160, a fuel-line level sensor (FL20) 170, a fuel-line drain valve (FDV) 180, and the like.

The FBV 100 may be configured to block the hydrogen supplied to the fuel cell stack 140. The FSV 110 may be configured to adjust the pressure of hydrogen supplied to the fuel cell stack 140. Additionally, the FEJ 120 may be configured to supply hydrogen to the fuel cell stack 140 by applying pressure to hydrogen as a hydrogen discharger. The pressure sensor 130 may be configured to measure the pressure of hydrogen supplied to the fuel cell stack 140.

The fuel cell stack 140 may be configured to generate electricity using a chemical reaction between hydrogen and oxygen. The FPV 150 may be configured to discharge hydrogen electrode condensed water and impurities in the fuel cell stack 140. The FWT 160 may be configured to store water. Additionally, the FL20 170 may be configured to measure the level of water stored in the FWT 160. The FDV 180 may be configured to discharge the water stored in the FWT 160.

Figure 2:
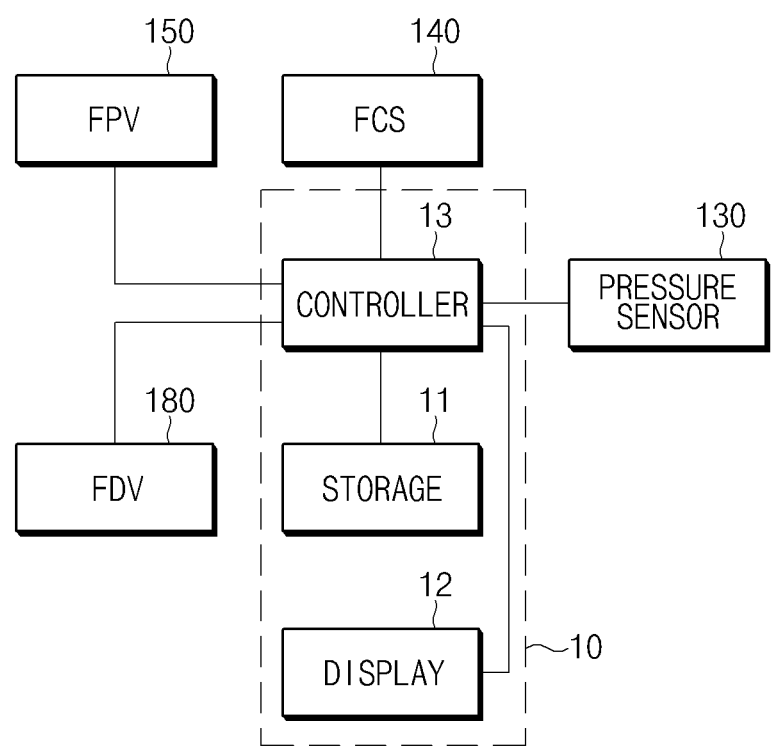
FIG. 2 is a view illustrating an apparatus for controlling driving of a fuel cell vehicle according to an exemplar)/ embodiment of the present disclosure.

FIG. 2 is a view illustrating an apparatus for controlling driving of a fuel cell vehicle according to an exemplary embodiment of the present disclosure. As shown in FIG. 2, an apparatus 10 for controlling driving of a fuel cell vehicle according to an exemplary embodiment of the present disclosure may include storage 11, a display 12, and a controller 13. In particular, according to a scheme of implementing the apparatus 10 for controlling driving of a fuel cell vehicle according to an exemplary embodiment of the present disclosure, components may be combined with each other and implemented as one, or some components may be omitted.

Looking at the respective components, first, the storage 11 may include various logics, algorithms, and programs required in the operations of grasping the cause of a current limit in the fuel cell vehicle being driven, tuning on a warning light to induce movement to a repair shop when the cause is due to a failure in the fuel cell stack 140, and when the cause due to the measurement error of the pressure sensor 130, compensating for the measurement error. Particularly, the current limit indicates a state in which the fuel cell stack 140 does not output the current required by the fuel cell vehicle.

The storage 11 may be configured to store a reference time (e.g., about 50 hours) used to determine whether a current limit is caused by a failure of the fuel cell stack 140 or a measurement error of the pressure sensor 130 when the current limit occurs in the fuel cell vehicle. The storage 11 may be configured to store reference charge amount information (e.g., about 500 C) used to determine a hydrogen purge time point to increase the amount of hydrogen supplied to the fuel cell stack 140 when the current limit occurs.

Additionally, the storage 11 may be configured to store a pressure value (e.g., about 130 kpa) of hydrogen supplied to the fuel cell stack 140 when the current limit occurs. The storage 11 may be configured to include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, and an optical disk type memory.

The display 12 may be implemented with a cluster, a head up display (HUD), an audio video navigation (AVN) system, or the like, and may be configured to turn on a warning light or display a text informing a failure when the fuel cell stack 140 is failed. The controller 13 may be configured to perform the overall control such that each component executes a function related thereto. The controller 13 may be implemented in the form of hardware or software, or may be implemented in the form of a combination of hardware and software. Preferably, the controller 13 may be implemented with a microprocessor, but is not limited thereto. The controller 13 may be specifically programmed to execute the method discussed herein.

In particular, the controller 13 may be configured to perform various controls required in the operations of grasping the cause of a current limit in the fuel cell vehicle traveling, turning on a warning light to induce movement to a repair shop when the cause is due to a failure in the fuel cell stack, and when the cause is due to the measurement error of the pressure sensor 130, compensating for the measurement error.

Hereinafter, the operations of grasping the cause of the current limit and compensating for the measurement error of the pressure sensor 130 by the controller 13 will be described in detail. The controller 13 may be configured to detect the minimum cell voltage and a cell voltage ratio by monitoring the voltage of the fuel cell stack 140 and the voltage of each cell in the fuel cell stack 140. In particular, the cell voltage ratio refers to a value obtained by dividing the minimum cell voltage (e.g., the minimum voltage among the cell voltages) by the average cell voltage (e.g., average voltage of all cell voltages).

The controller 13 may be configured to perform an operation of compensating for the measurement error of the pressure sensor 130 at every specified mileage in a normal state where the current limit does not occur. In particular, the controller 13 may be configured to count the time from the time point (hereinafter, referred to as an error compensation time point) when the measurement error of the pressure sensor 130 is compensated and may reset the counting at the next error compensation time point. The controller 13 may be configured to determine whether a first condition is met when a current limit occurs in a state where the fuel cell vehicle is being driven. Particularly, the first condition may be the minimum cell voltage less than a first reference value (e.g., about 0.8 V) and the cell voltage ratio is less than a second reference value (e.g., about 0.82). In other words, the controller 13 may be configured to detect the current limit caused when the first condition is met.

The controller 13 may be configured to determine whether the second condition is met while the first condition is met. In particular, the second condition includes that the time point at which the current limit occurs exceeds a reference time from the time point immediately before the current error is compensated. The reference time may be determined through an experiment as a time taken to cause a measurement error of the pressure sensor 130. The controller 13 may be configured to determine that a failure has occurred in the fuel cell stack 140 when the second condition is not met while the first condition is met, and operate the display 12 to turn on a warning light.

Additionally, the controller 13 may be configured to determine that a measurement error occurs in the pressure sensor 130 when the second condition is met while the first condition is met, and take emergency measures. In other words, the controller 13 may be configured to perform a hydrogen purge based on a reference charge amount (e.g., about 500 C) as an emergency measure, and increase the supply pressure of hydrogen to a threshold value (e.g., about 130 kpa) for a smooth hydrogen purge. Particularly, the hydrogen purge based on the reference charge amount refers to that the hydrogen purge is performed whenever the reference charge amount (units of 500 C) is output from the fuel cell stack 140. The controller 13 may be configured to determine that a failure occurs in the fuel cell stack 140 when the current limit is not resolved in spite of the emergency measures, and operate the display 12 to turn on the warning light.

The controller 13 may be configured to determine that the measurement error occurs in the pressure sensor 130 when the current limit is resolved due to the emergency measure, and compensate for the measurement error of the pressure sensor 130 when the fuel cell vehicle is turned off (fuel cell stops). In other words, the controller 13 may be configured to open both the FPV 150 and the FDV 180, and then, determine the difference between the pressure value measured by the pressure sensor 130 and the reference pressure (e.g., about 100 kpa) as a compensation value of the pressure sensor 130. In particular, the reference pressure may be atmospheric pressure. For example, when the pressure value measured by the pressure sensor 130 is about 110 kpa in a state where both the FPV 150 and the FDV 180 may be open, the difference between the pressure value and the reference pressure is about 10 kpa, and therefore the compensation value for the measurement error of the pressure sensor 130 is about −10 kpa.

Figure 3:
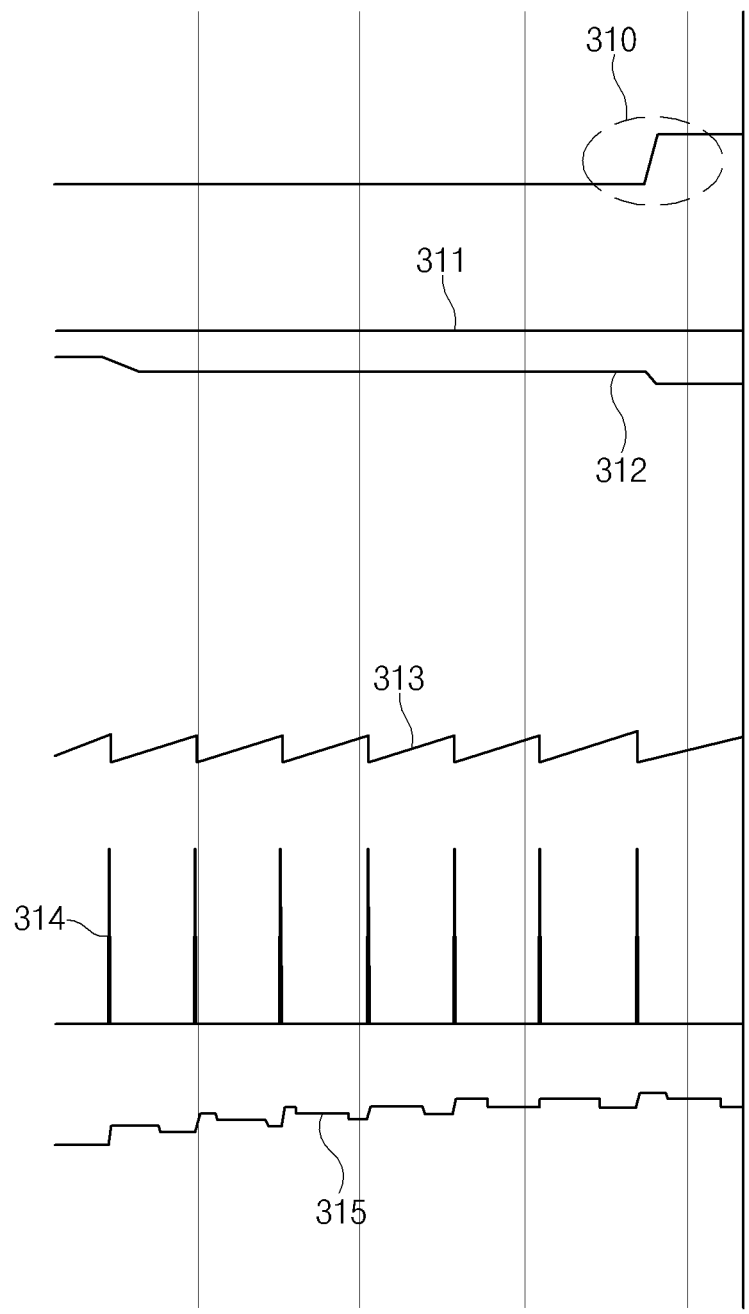
FIG. 3 is a performance analysis diagram of an apparatus for controlling driving of a fuel cell vehicle according to an exemplary embodiment of the present disclosure.

FIG. 3 is a performance analysis diagram of an apparatus for controlling driving of a fuel cell vehicle according to an exemplary embodiment of the present disclosure. FIG. 3 illustrates a state in which the controller 13 executes emergency measures in a state in which the first and second conditions are met. As shown in FIG. 3, the current limit of the fuel cell stack 140 has been solved through '310', and the cell voltage ratio 311 and the minimum cell voltage 312 are stably provided. In FIG. 3, reference numeral '313' represents a calculated value for hydrogen purge, reference numeral '314' represents a control signal for opening the FPV 150, and reference numeral '315' represents an estimated concentration value of a hydrogen exhaust port.

Figure 4:
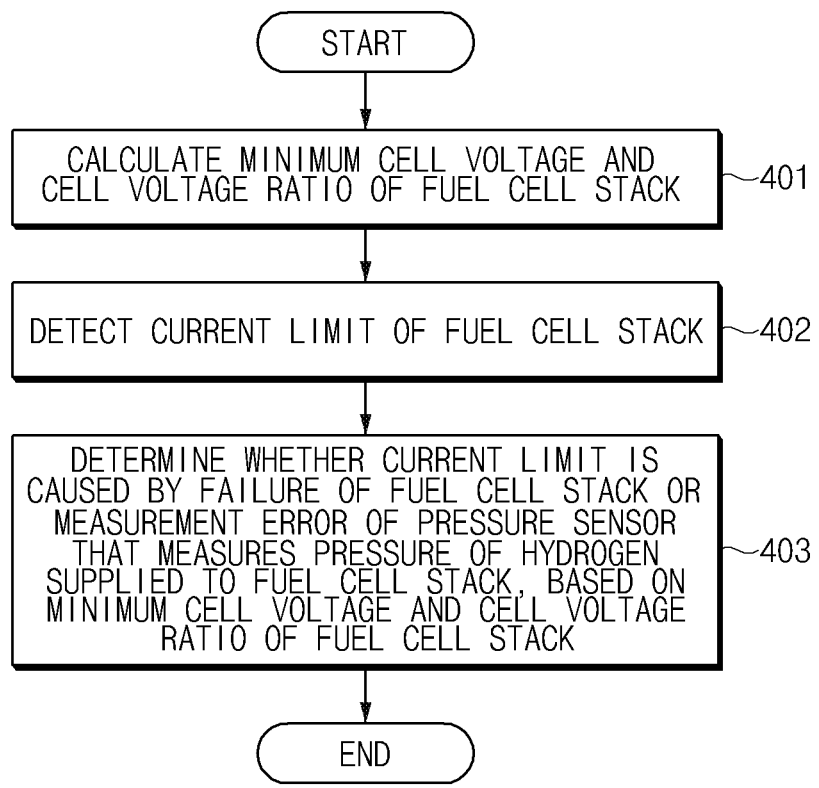
FIG. 4 is a flowchart illustrating a method of controlling driving of a fuel cell vehicle according to an exemplar)/ embodiment of the present disclosure.

FIG. 4 is a flowchart illustrating a method of controlling driving of a fuel cell vehicle according to an exemplary embodiment of the present disclosure. First, in operation 401, the controller 13 may be configured to monitor the fuel cell stack 140 to calculate the minimum cell voltage and the cell voltage ratio. Then, in operation 402, the controller 13 may be configured to detect the current limit of the fuel cell stack 140. In other words, the controller 13 may be configured to determine that the current limit occurs in the fuel cell stack 140. Next, in operation 403, the controller 13 may be configured to determine whether the current limit is caused by a failure of the fuel cell stack 140 or the measurement error of the pressure sensor 130 configured to measure the pressure of hydrogen supplied to the fuel cell stack 140, based on the calculated minimum cell voltage and the cell voltage ratio.

Figure 5:
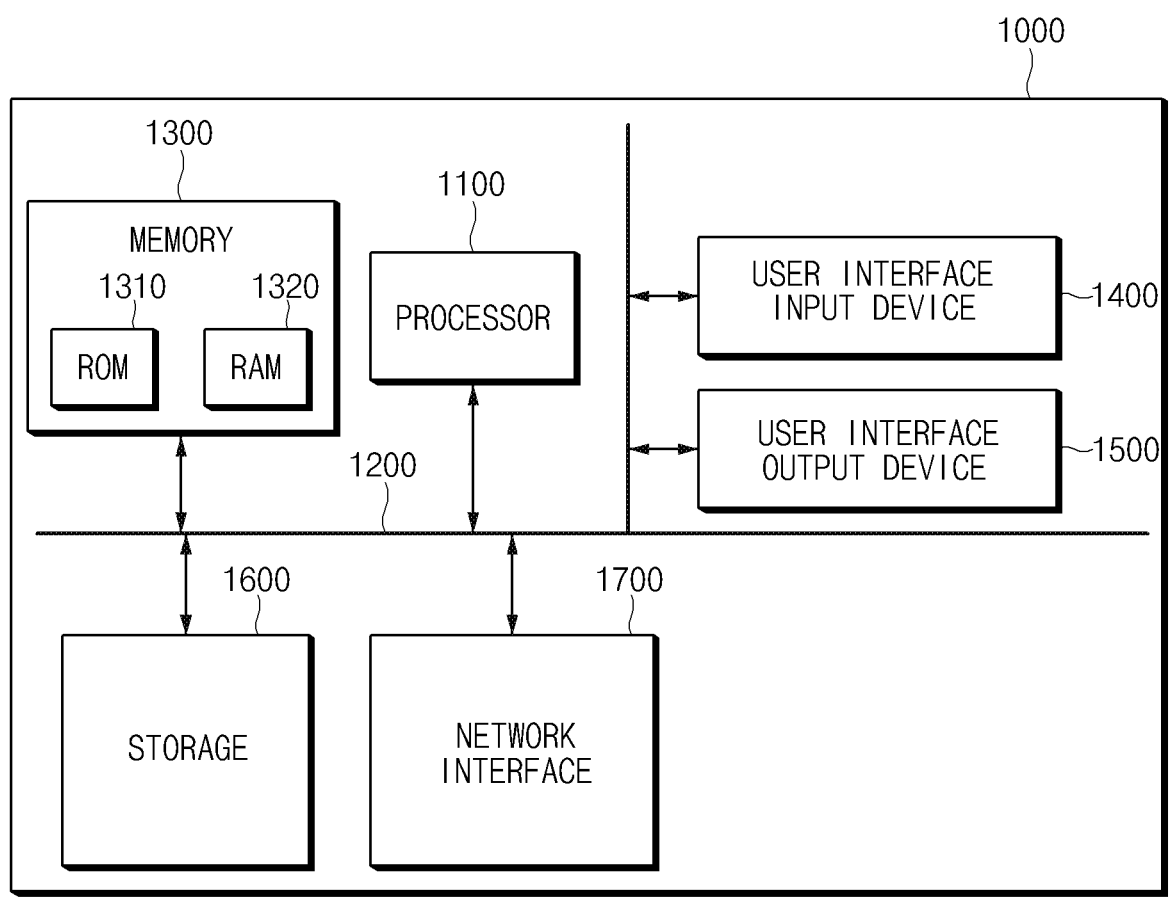
FIG. 5 is a block diagram illustrating a computing system for executing a method of controlling driving of a fuel cell vehicle according to an exemplary embodiment of the present disclosure.

FIG. 5 is a block diagram illustrating a computing system for executing a method of controlling driving of a fuel cell vehicle according to an exemplary embodiment of the present disclosure. Referring to FIG. 5, as described above, a method of controlling driving of a fuel cell vehicle according to an exemplary embodiment of the present disclosure may be implemented through a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU), or a semiconductor device configured to process instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, the processes of the method or algorithm described in relation to the exemplar)/embodiments of the present disclosure may be implemented directly by hardware executed by the processor 1100, a software module, or a combination thereof. The software module may reside in a storage medium (e.g., the memory 1300 and/or the storage 1600), such as a RAM, a flash memory, a ROM, an EPROM, an EEPROM, a register, a hard disk, solid state drive (SSD), a detachable disk, or a CD-ROM. The exemplar)/storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the apparatus for controlling driving of a fuel cell vehicle and a method thereof, it may be possible to grasp the cause of a current limit in the fuel cell vehicle traveling and turn on a waning light to induce movement to a repair shop when the cause is due to a failure of the fuel cell stack. In addition, when the cause is the measurement error of a sensor configured to measure the pressure of hydrogen supplied to the fuel cell stack, the measurement error may be compensated, thereby preventing the durability of the fuel cell stack The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the exemplary embodiments of the present disclosure. The scope of the present disclosure should be construed by the claims, and it will be understood that all the technical spirits within the equivalent range fall within the scope of the present disclosure.

What is claimed is:

1. An apparatus for controlling driving of a fuel cell vehicle, comprising:
   a fuel cell stack configured to generate electricity using a chemical reaction between hydrogen and oxygen;
   a pressure sensor configured to measure a pressure of hydrogen supplied to the fuel cell stack; and
   a controller configured to determine whether a current limit is caused by a failure of the fuel cell stack or a measurement error of the pressure sensor when the current limit occurs in the fuel cell stack,
   wherein the controller is configured to:
   calculate a minimum cell voltage and a cell voltage ratio by monitoring each cell of the fuel cell stack, and
   determine that the failure occurs in the fuel cell stack when the minimum cell voltage is less than a first reference value, the cell voltage ratio is less than a second reference value, and a time point at which the current licit occurs does not exceed a reference time from a time point at which a measurement error of the pressure sensor is compensated,
   wherein the controller is configured to turn on a warning light in response to determining that the failure occurs in the fuel cell stack.

2. An apparatus for controlling driving of a fuel cell vehicle, comprising:
   a fuel cell stack configured to generate electricity using a chemical reaction between hydrogen and oxygen;
   a pressure sensor configured to measure a pressure of hydrogen supplied to the fuel cell stack; and
   a controller configured to determine whether a current limit is caused by a failure of the fuel cell stack or a measurement error of the pressure sensor when the current limit occurs in the fuel cell stack,
   wherein the controller is configured to:
   calculate a minimum cell voltage and a cell voltage ratio by monitoring each cell of the fuel cell stack, and
   perform a hydrogen purge based on a reference charge amount in response to determining that the minimum cell voltage is less than a first reference value, the cell voltage ratio is less than a second reference value, and a time point at which the current limit occurs exceeds a reference time from a time point at which a measurement error of the pressure sensor is compensated.

3. The apparatus of claim 2, wherein the controller is configured to increase a hydrogen supply pressure to a threshold value when performing the hydrogen purge based on the reference charge amount.

4. The apparatus of claim 2, wherein the controller is configured to determine that the failure occurs in the fuel cell stack when the current limit is not removed even after performing the hydrogen purge based on the reference charge amount.

5. The apparatus of claim 2, wherein the controller is configured to determine that the measurement error occurs in the pressure sensor when the current limit is removed after performing the hydrogen purge based on the reference charge amount.

6. The apparatus of claim 5, wherein the controller is configured to compensate for the measurement error of the pressure sensor based on a difference between a pressure value measured by the pressure sensor and a reference pressure after opening a fuel-line purge valve (FPV) and a fuel-line drain valve (FDV).

* * * * *